US012663079B2

(12) United States Patent
Perret et al.

(10) Patent No.: US 12,663,079 B2
(45) Date of Patent: Jun. 23, 2026

(54) SEALING ELEMENT

(71) Applicant: Carl Freudenberg KG, Weinheim (DE)

(72) Inventors: Fabien Perret, Langres (FR); Thomas Avril, Saint-Victurnien (FR); Kar Lian Chin, Hooksett, NH (US); Herve Di Meo, Saint-Cyr (FR); Robert Lidster, Bedford, NH (US)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 18/900,965

(22) Filed: Sep. 30, 2024

(65) Prior Publication Data

US 2026/0016089 A1 Jan. 15, 2026

(30) Foreign Application Priority Data

Jul. 10, 2024 (EP) ..................................... 24187790

(51) Int. Cl.
F16J 15/10 (2006.01)
(52) U.S. Cl.
CPC ................................... F16J 15/104 (2013.01)
(58) Field of Classification Search
CPC ........ F16J 15/104; F16J 15/106; F16J 15/025; F16J 15/061
See application file for complete search history.

(56) References Cited

U.S. PATENT DOCUMENTS

| | | | | | |
|---|---|---|---|---|---|
| 3,334,774 | A | * | 8/1967 | Poltorak | F16J 15/106 277/648 |
| 3,727,926 | A | * | 4/1973 | Berry | F16J 15/106 285/350 |
| 9,587,744 | B2 | * | 3/2017 | Yoshida | F16J 15/025 |
| 10,269,595 | B2 | * | 4/2019 | Kunsch | F16J 15/022 |
| 2015/0279706 | A1 | * | 10/2015 | Nakagawa | F16J 15/08 277/637 |
| 2016/0258533 | A1 | * | 9/2016 | Yoshida | F16J 15/025 |
| 2019/0107199 | A1 | * | 4/2019 | Dore | F16J 15/061 |
| 2019/0360589 | A1 | * | 11/2019 | Watanabe | F16J 15/106 |
| 2019/0390773 | A1 | * | 12/2019 | Adachi | F16J 15/025 |
| 2020/0408304 | A1 | * | 12/2020 | Ono | F16J 15/062 |
| 2021/0367296 | A1 | * | 11/2021 | Ono | F16J 15/106 |
| 2021/0404556 | A1 | * | 12/2021 | Hagiwara | F16J 15/104 |
| 2023/0332398 | A1 | * | 10/2023 | Förg | F16J 15/104 |

(Continued)

FOREIGN PATENT DOCUMENTS

| | | |
|---|---|---|
| CN | 113389900 A | 9/2021 |
| EP | 2634458 A1 | 9/2013 |
| EP | 4299961 A1 | 1/2024 |

(Continued)

*Primary Examiner* — Eugene G Byrd
(74) *Attorney, Agent, or Firm* — LEYDIG, VOIT & MAYER, LTD.

(57) ABSTRACT
A sealing element for a high-pressure connection, including a first portion and a second portion. The first portion is configured to dispose the sealing element in a clearance. A first side of the first portion is disposed so as to be substantially orthogonal to a second side of the second portion. The second portion has a third side, and the second portion is configured to press the third side onto a gap to be sealed when an increased ambient pressure acts on the second side.

12 Claims, 3 Drawing Sheets

(56)                           References Cited

U.S. PATENT DOCUMENTS

2024/0003472 A1* 1/2024 Gericke ................. F16J 15/062

FOREIGN PATENT DOCUMENTS

| EP | 4375544 | A1 |   | 5/2024 |             |
|----|---------|----|---|--------|-------------|
| JP | 2004044775 | A |   | 2/2004 |             |
| JP | 2010054013 | A | * | 3/2010 |             |
| JP | 2015090210 | A | * | 5/2015 | ............. F16J 15/025 |

* cited by examiner

SEALING ELEMENT

CROSS REFERENCE TO RELATED APPLICATIONS

This application claims benefit to European Patent Application No. EP 24 187 790.1, filed on Jul. 10, 2024, which is hereby incorporated by reference herein.

FIELD

The present invention relates to a sealing element for a high-pressure connection, to a sealing unit, and to a system for electrolysis.

BACKGROUND

There are currently a multiplicity of different solutions for designing sealing elements. As a result of the increasing number of systems for electrolysis, and the increased requirements in terms of quality and output, there is a continuous increase in terms of the demand for innovative and robust sealing elements.

The consistent increase in efficiency in plant engineering for reducing consumption and the increasing competition cause a cost pressure so that more cost-effective and more efficient components for systems are facing higher demand.

SUMMARY

In an embodiment, the present disclosure provides a sealing element for a high-pressure connection, comprising a first portion and a second portion. The first portion is configured to dispose the sealing element in a clearance. A first side of the first portion is disposed so as to be substantially orthogonal to a second side of the second portion. The second portion has a third side, and the second portion is configured to press the third side onto a gap to be sealed when an increased ambient pressure acts on the second side.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

Exemplary embodiments of the invention will be described in detail hereunder with reference to the appended drawings. In the drawings.

DETAILED DESCRIPTION

Figure 1:
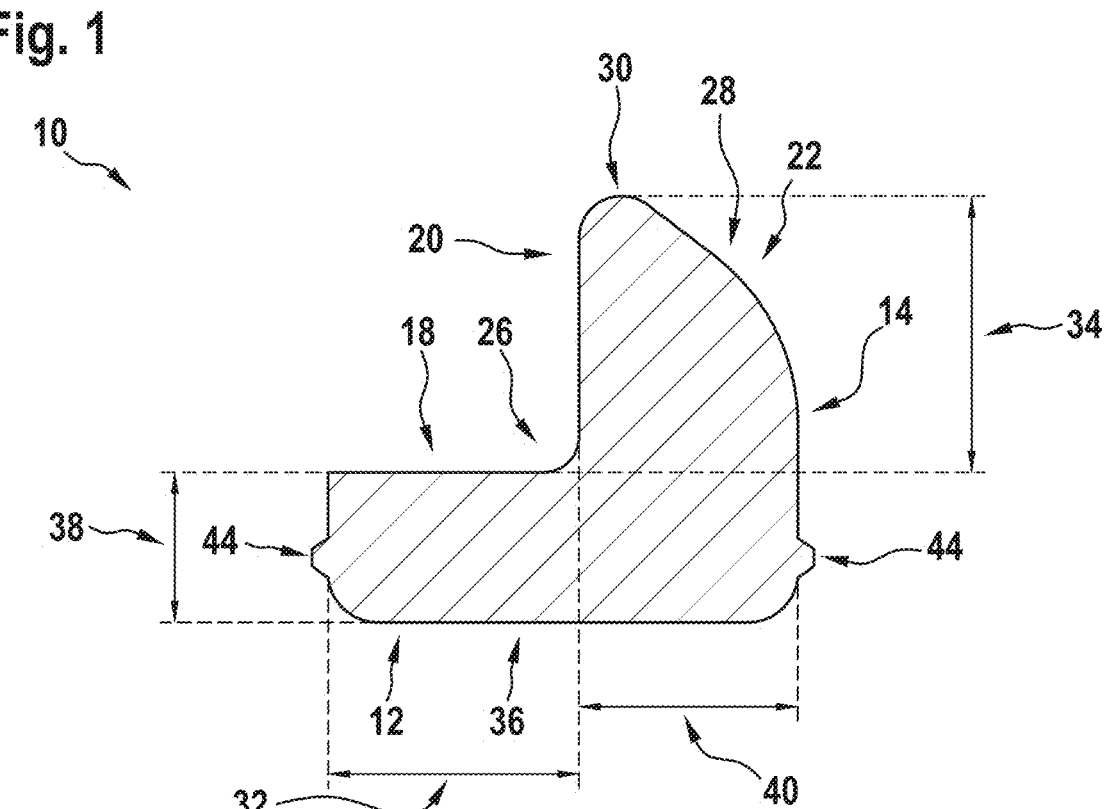
FIGS. 1 to 3 illustrate a sealing element according to an embodiment of the present disclosure.

In an embodiment, an improved sealing element is provided.

One advantage of the sealing element according to the present disclosure is that the sealing element can be activated by an ambient pressure with the aid of the specific disposal of the first side relative to the second side in order to be able to avoid leakage in high-pressure applications, even when said sealing element is compressed between two components. By virtue of the disposal of the first portion relative to the second portion, a gap to clearance height ratio of up to 0.3 can in particular be sealed in the process.

This is achieved according to the present disclosure in that the sealing element for a high-pressure connection comprises a first portion and a second portion, wherein the first portion is configured to dispose the sealing element in a clearance, wherein a first side of the first portion is disposed so as to be substantially orthogonal to a second side of the second portion, wherein the second portion has a third side, wherein the second portion is specified to press the third side onto a gap to be sealed when an increased ambient pressure acts on the second side.

By virtue of the cross section of the sealing element by means of the first side and the second side of the first and/or the second portion it is made possible that the sealing element is activated in a compressed state when an ambient pressure is applied to the sealing element, so as to in this way increase the tightness of the sealing element, or of a gap to be sealed, when the latter is impinged with a highly pressurized fluid. The sealing element preferably has two portions which are disposed in the form of webs or the like on the sealing element. The first web is preferably disposed so as to be substantially orthogonal to the second web. In this way, the first portion having the first side, and the second portion having the second side, are disposed so as to be substantially mutually orthogonal. Substantially orthogonal in this context is understood to mean in particular a variation of ±45°, in particular production-related tolerances. The first portion forms a type of base of the sealing element, which can be inserted in a clearance of a component in order thus to be able to fix the sealing element at a fixed position in relation to this component. The second portion of the sealing element protrudes from the clearance in such a way that this second portion bears on a further component. In this way, a gap which can be created between the component and the further component can be sealed by means of the sealing element. The pressure is preferably increased on the second side of the portion, so that the third side is pressed onto the gap to be sealed.

The first side and the second side preferably have an intersection point, wherein the third side at least in part has a contour, in particular a curvature, about the intersection point.

One advantage of this embodiment lies in that the sealing performance of the sealing element can be further increased because a larger contact face between the sealing element and the component is formed when the sealing element is under pressure. For example, the area that covers the gap can be enlarged. Furthermore, the contour can be of any shape or form. Preferably, the contour can be a curvature.

The second side and the third side are preferably connected to one another by means of a roundness.

One advantage of this embodiment lies in that the contact face between the sealing element and the further component is increased so as thus to increase the overall sealing performance, or in order to increase a maximum pressure.

A first length of the first side and a second length of the second side preferably have a length ratio between 0.7 and 1.3.

One advantage of this embodiment lies in that it has surprisingly been able to be established that the sealing performance, in particular one possible limit for the pressure is up to 80 bar, is at its maximum at this length ratio.

Furthermore, preferably, the first portion has a fourth side, wherein a first thickness between the first side and the fourth side, and a second thickness between the second side and the third size, have a thickness ratio between 0.5 to 1.2.

One advantage of this embodiment lies in that in particular comparatively large gaps to clearance height ratio of up to 0.3 can be kept substantially tight, with the aid of the thickness ratio. The first side and the fourth side are preferably formed so as to be mutually opposite on the first portion, and the second side and the third side are preferably formed so as to be substantially mutually opposite on the second portion.

The first portion preferably has two mouldings which are specified to secure the sealing element in the clearance.

One advantage of this embodiment lies in that the assembly procedure of the further component on the component is simplified, because the sealing element remains securely in the first component, or in the clearance, by means of the mouldings.

The sealing element preferably has a substantially continuous contour in order to form a ring.

One advantage of this embodiment lies in that a variable gap between the components can be corrected over an entire contour of the sealing unit by means of the sealing element.

A further aspect of the present disclosure relates to a sealing unit having:

a first component, a second component, a sealing element as described above and hereunder, wherein the sealing element is specified to substantially stop a fluid flow through a gap between the first component and the second component.

One advantage of this embodiment lies in that the sealing element can seal a gap between the first component and the second component, where O-rings or the like may fail. The sealing element between the components herein can be self-sealing in particular at high pressures, because the pressure applied to the sealing element increases the sealing performance of the sealing element.

Preferably, a height ratio between a height of the gap and a height of a clearance is up to 0.3.

One advantage of this embodiment lies in that even large gaps can be sealed at a high pressure, in particular by means of the provided sealing element.

A further aspect relates to a system for electrolysis, which has a sealing element as described above and hereunder, and/or has a sealing unit as described above and hereunder.

It is furthermore to be pointed out that the term "unit" herein is likewise to be understood in a wide sense, and comprises a configuration of the respective units in one part or else a configuration in multiple parts, wherein the respective sub-units do not have to be provided at one position in the system but can also be provided so as to be distributed on the system.

All of the disclosures made above and hereunder in the context of one aspect of the present disclosure apply in an equivalent manner to all further aspects of the present disclosure.

The figures are only a schematic and not true to scale. Identical elements, elements of identical function or equivalent elements can be provided with the same reference signs in the figures.

FIG. 1 shows a sealing element 10 according to an embodiment. The sealing element 10 for a high-pressure connection preferably has a first portion 12 and a second portion 14, wherein the first portion 12 is specified to dispose the sealing element 10 in a clearance 16, wherein a first side 18 of the first portion 12 is disposed so as to be substantially orthogonal to a second side 20 of the second portion 14, wherein the second portion 14 has a third side 22, wherein the second portion 14 is specified to press the third side 22 onto a gap 24 to be sealed when an increased ambient pressure acts on the second side 20.

As is illustrated in FIG. 1, the first side 18 and the second side 20 preferably have an intersection point 26. The third side 22 at least in part preferably has a contour 28 about the intersection point 26. The center of the contour 28 herein is preferably at the same position as the intersection point 26. The second side 20 and the third side 22 are preferably connected to one another by means of a roundness 30, the latter forming in particular the tip of the second portion 14.

A first length 32 of the first side 18 and a second length 34 of the second side 20 are preferably configured at a length ratio between 0.7 and 1.3.

Furthermore, the first portion 12 has preferably a fourth side 36, which is in particular disposed opposite the first side 18. Furthermore, a first thickness 28 between the first side 18 and the fourth side 36, and a second thickness 40 between the second side 20 and the third side 22, are at a thickness ratio between 0.5 to 1.2.

Furthermore preferably, the first portion 12 has two mouldings 44.

Figure 2:
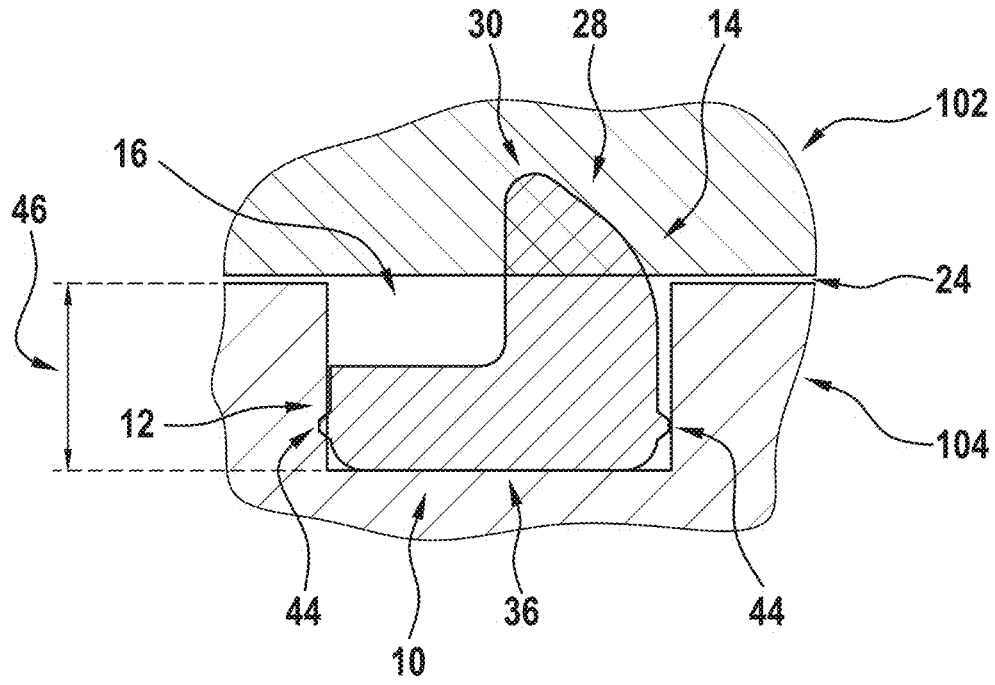

FIG. 2 shows a sealing element 10 according to an embodiment. The sealing element 10 is preferably disposed between a first component and 102 and a second component 104. In this way, a gap 24 can be present between the first component 102 and the second component 104. Preferably, a height ratio between a height of the gap 24 and a height 46 of a clearance 16 is up to 0.3. The sealing element 10 is preferably specified to substantially stop a fluid flow through the gap 24 between the first component 102 and the second component 104. Substantially stop in this context preferably means that production-related tolerances can in particular lead to leakages, but they do not have any notable influence in terms of the sealing performance. As can be seen in FIG. 2, the first portion 12 of the sealing element 10 is disposed in a clearance 16 of the second component 104. The second portion 14 herein is in contact with the first component 102.

Figure 3:
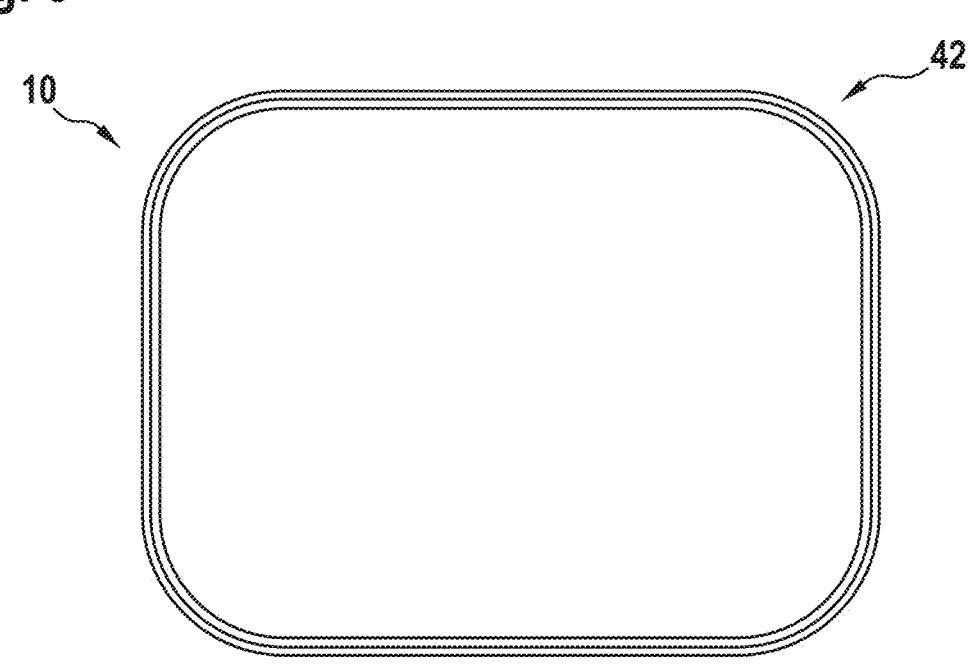

FIG. 3 shows a sealing element 10 according to an embodiment. As can be seen in FIG. 3, the sealing element 10 has a substantially continuous contour 42 in order to form a ring.

Figure 4:
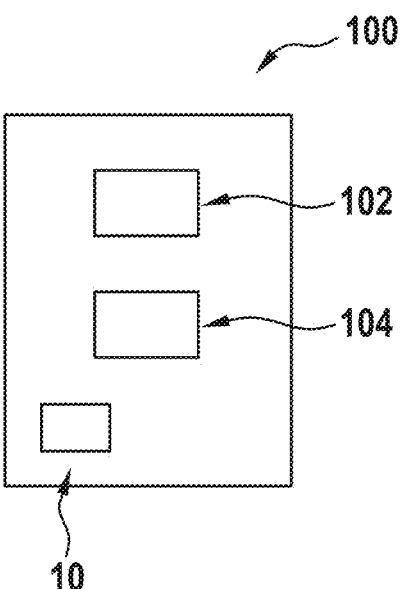
FIG. 4 illustrates a sealing element according to an embodiment of the present disclosure.

FIG. 4 shows a sealing unit 100 according to an embodiment. The sealing unit 100 has a first component 102, a second component 104 and a sealing element 10 as described above and hereunder, wherein the sealing element 10 is preferably specified to substantially stop a fluid flow through a gap 24 between the first component 102 and the second component 104. Furthermore, the gap 24 to clearance height (46) ratio is preferably up to 0.3.

Figure 5:
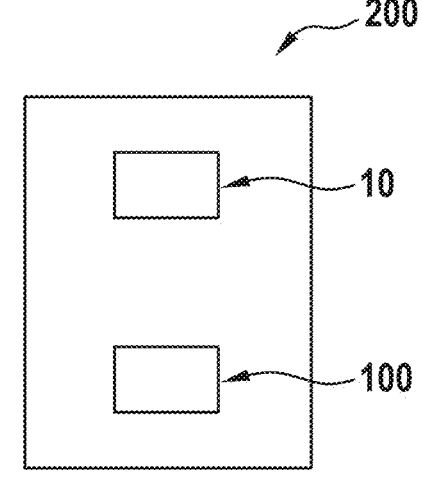
FIG. 5 illustrates a system for electrolysis.

FIG. 5 shows a system 200 for electrolysis according to an embodiment. The system 200 preferably has a sealing element 10 as described above and hereunder, and/or a sealing unit 100 as described above and hereunder.

Figure 6:
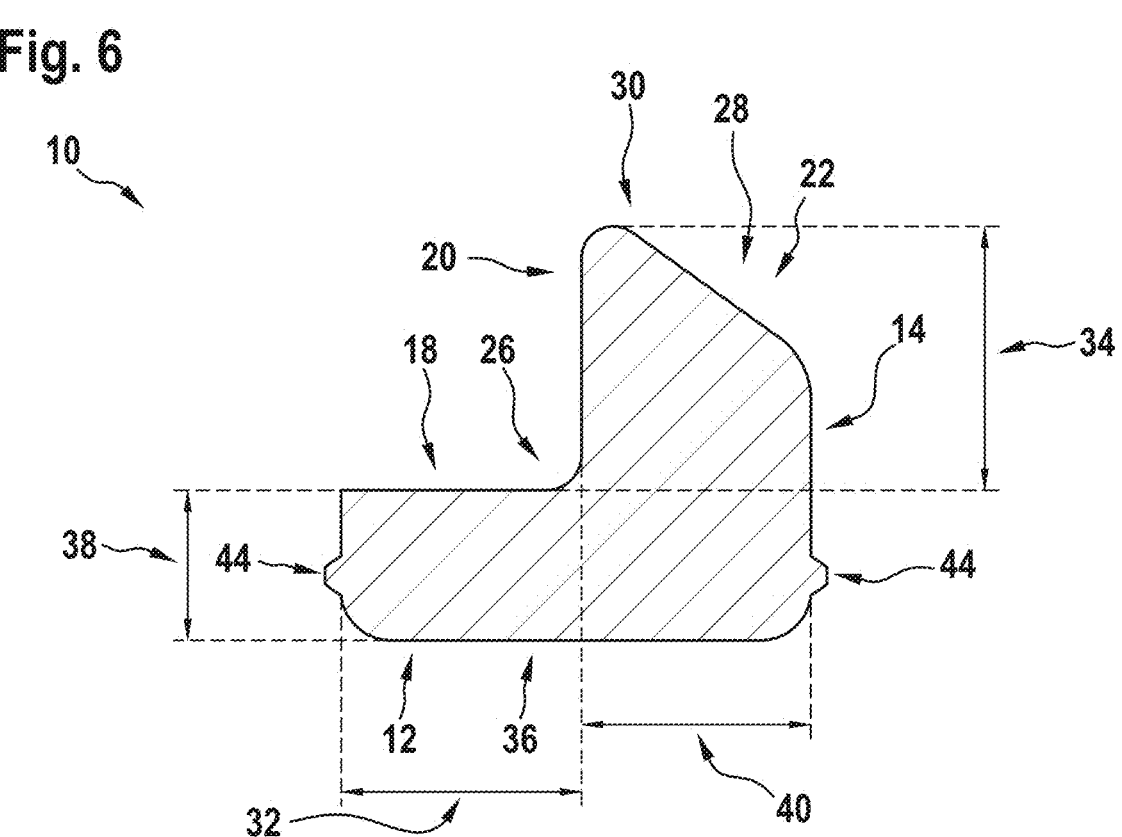
FIGS. 6 and 7 illustrates a sealing element according to an embodiment of the present disclosure.

FIG. 6 shows a sealing element 10 according to an embodiment. As can be seen in FIG. 6 the sealing element 10, wherein the second portion 14 comprises a contour 28 on the third side 22, which is basically a line.

Figure 7:
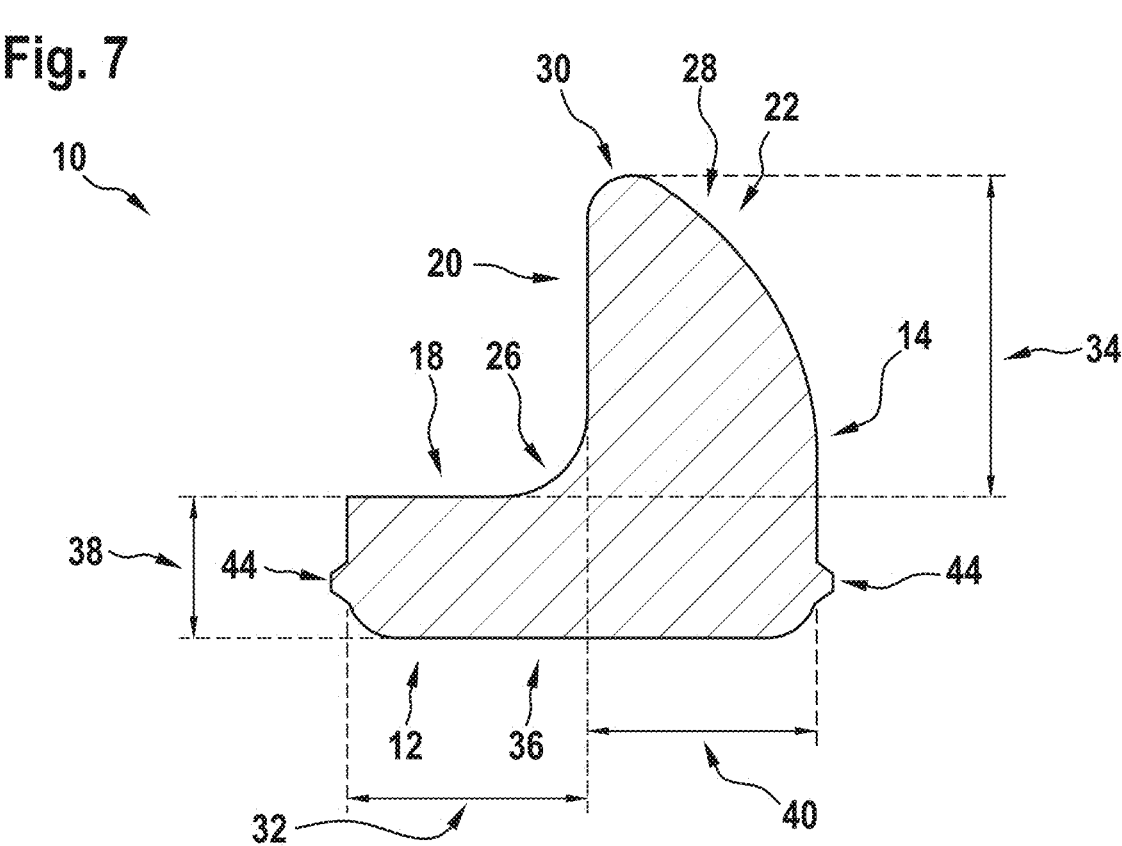

FIG. 7 shows an sealing element 10 according to an embodiment. As can be seen in FIG. 7 the sealing element 10, wherein the second portion 14 comprises a contour 28 on the third side 22, which is a curvature with a large diameter.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Sealing element
12 First portion
14 Second portion
16 Clearance
18 First side
20 Second side
22 Third side
24 Gap to be sealed
26 Intersection point
28 Contour
30 Roundness
32 First length
34 Second length
36 Fourth side
38 First thickness
40 Second thickness
42 Contour
44 Mouldings
46 Clearance height
100 Sealing unit
102 First component
104 Second component
200 System

The invention claimed is:

1. A sealing element for sealing a high-pressure connection between a first component and a second component, comprising:
a first portion configured to be disposed in a clearance of the second component; and
a second portion comprising a tip,
wherein a first side of the first portion is oriented substantially horizontally relative to the second component, and a second side of the second portion is oriented substantially vertically relative to the second component,
wherein the second portion has a third side configured to be compressed so as to seal a gap when an increased ambient pressure acts on the second component, and
wherein the first side and the second side have an intersection point, and wherein the third side at least in part has a contour having a curvature about the intersection point from the tip of the second portion to a point disposed within the clearance, so as to be acted on by a bottom surface of the second component upon the increased ambient pressure.

2. The sealing element according to claim 1, wherein the second side and the third side are connected to one another by a rounded portion.

3. The sealing element according to claim 1, wherein a first length of the first side and a second length of the second side have a length ratio between 0.7 and 1.3.

4. The sealing element according to claim 1, wherein the first portion has a fourth side, wherein a first thickness between the first side and the fourth side, and a second thickness between the second side and the third side, have a thickness ratio between 0.5 to 1.2.

5. The sealing element according to claim 1, wherein the first portion has two mouldings which are configured to secure the sealing element in the clearance.

6. The sealing element according to claim 1, wherein the sealing element has a substantially continuous contour forming a ring.

7. A sealing unit comprising:
a first component;
a second component; and
the sealing element according to claim 1,
wherein the sealing element is configured to substantially stop a fluid flow through a gap between the first component and the second component.

8. The sealing unit according to claim 7, wherein a height ratio between a height of the gap and a height of a clearance is up to 0.3.

9. A system for electrolysis, comprising:
the sealing element according to claim 1.

10. A system for electrolysis comprising the sealing unit according to claim 7.

11. A sealing element for sealing a high-pressure connection between a first component and a second component, comprising:
a first portion configured to be disposed in a clearance of the second component; and
a second portion comprising a tip,
wherein a first side of the first portion is oriented substantially horizontally relative to the second component, and a second side of the second portion is oriented substantially vertically relative to the second component,
wherein the second portion has a third side configured to be compressed so as to seal a gap when an increased ambient pressure acts on the second component, wherein the second side and the third side are connected to one another by a rounded portion, and
wherein the first side and the second side have an intersection point, wherein the third side at least in part has a contour having a curvature about the intersection point from the tip of the second portion to a point disposed within the clearance, so as to be acted on by a bottom surface of the second component upon the increased ambient pressure, wherein the curvature extends from the rounded portion.

12. The sealing element according to claim 1, wherein the curvature merges tangentially into a straight portion parallel to the second side.

\* \* \* \* \*